T. J. NOTTINGHAM.
Gage-Cock.

No. 160,459.

Patented March 2, 1875.

Attest
Ph. Fowler
J. Edgar Gross

Inventor
Thos. J. Nottingham
By F. Millward
Attorney

UNITED STATES PATENT OFFICE.

THOMAS J. NOTTINGHAM, OF CINCINNATI, OHIO.

IMPROVEMENT IN GAGE-COCKS.

Specification forming part of Letters Patent No. 160,459, dated March 2, 1875; application filed November 13, 1874.

*To all whom it may concern:*

Be it known that I, THOMAS J. NOTTINGHAM, of Cincinnati, Hamilton county, and State of Ohio, have invented certain new and useful Improvements in Gage-Cocks, of which the following is a specification:

My invention consists of a gage-cock having a pair of valves, both of which are so seated that they will be automatically closed by the boiler-pressure, one of which is located in the shank of the cock in the boiler-shell and the other in the detachable cap, the one in the shank being designed to protect the other or main valve from actual contact with the water in the boiler, and to prevent any considerable escape of water when the outer or main valve is removed for cleaning and regrinding.

Figure 1:
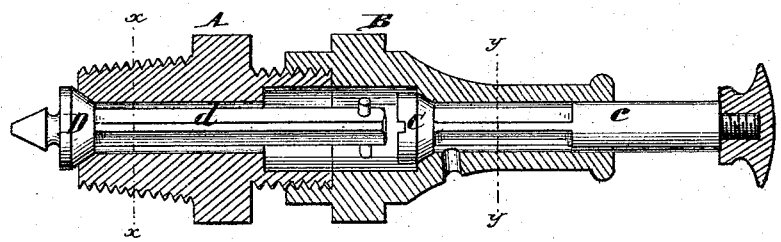
Figure 2:
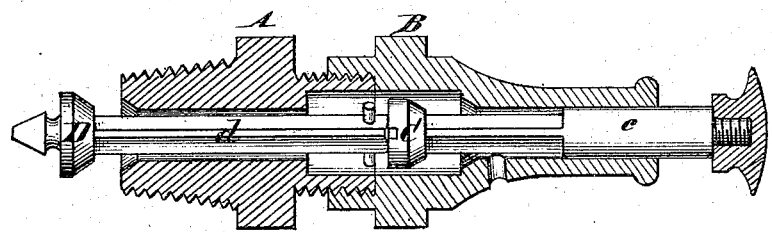
Figure 3:
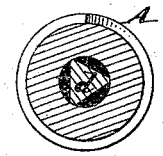
Figure 4:

Figure 1 is a section through cock with valves closed. Fig. 2 is a similar section with valves closed. Fig. 3 is a cross-section on line $x\,x$, Fig. 1. Fig. 4 is a cross-section on line $y\,y'$, Fig. 1.

A is the shank of the cock, fitted with the removable cap B. C is the main valve, seated in cap B and operated by the usual valve-stem $c$. D is the secondary valve, located in the shank A, and operated through stem $d$ by the valve C. The stem $d$ is of such length that the valve D, when allowed by the operator, closes immediately before the valve C, the latter closing by the pressure of steam in the valve-chamber. The valve D is not relied upon for wholly preventing the escape of water and steam, but to protect the inside of the cock from the matter in the boiler, and to sustain the pressure and prevent escape from the boiler of any considerable amount of water or steam when the cap and its valve C are removed for cleaning or regrinding while the boiler is in use.

If necessary, a detachable link-connection may be made between the valve C and the stem $d$, so that the operator may be enabled to pull the valve D shut when it is stuck by incrustation; but I have, after some months' use, found such connection to be unnecessary, inasmuch as the valve D is closed first, and by the pressure and current of escaping water and steam sufficiently powerful and reliable for all purposes.

I claim—

A gage-cock in two parts, A B, having separate valves C D, both arranged to close automatically by boiler-pressure, substantially as specified.

In testimony of which invention I hereunto set my hand.

T. J. NOTTINGHAM.

Witnesses:
 EDGAR J. GROSS,
 R. M. HUNTER.